(12) United States Patent
Penney et al.

(10) Patent No.: US 8,160,950 B2
(45) Date of Patent: Apr. 17, 2012

(54) METHOD AND APPARATUS FOR TRADING ASSETS

(75) Inventors: Neill Penney, Surrey (GB); David Wright, New York, NY (US)

(73) Assignee: FX Alliance, LLC, New York, NY (US)

( * ) Notice: Subject to any disclaimer, the term of this patent is extended or adjusted under 35 U.S.C. 154(b) by 2360 days.

(21) Appl. No.: 10/703,090

(22) Filed: Nov. 7, 2003

(65) Prior Publication Data

US 2004/0143539 A1    Jul. 22, 2004

Related U.S. Application Data

(60) Provisional application No. 60/424,682, filed on Nov. 8, 2002.

(51) Int. Cl.
*G06Q 40/00* (2006.01)
(52) U.S. Cl. .................... 705/37; 705/36 R; 705/35
(58) Field of Classification Search .................... 705/37, 705/36 R, 35
See application file for complete search history.

(56) References Cited

U.S. PATENT DOCUMENTS

| | | | |
|---|---|---|---|
| 5,136,501 A | | 8/1992 | Silverman et al. |
| 5,727,165 A | | 3/1998 | Ordish et al. |
| 5,787,402 A | | 7/1998 | Potter et al. |
| 5,978,485 A | | 11/1999 | Rosen |
| 6,134,535 A | * | 10/2000 | Belzberg ..................... 705/36 R |
| 6,247,000 B1 | * | 6/2001 | Hawkins et al. ................. 705/37 |
| 6,343,278 B1 | | 1/2002 | Jain et al. |
| 6,421,653 B1 | | 7/2002 | May |
| 7,080,033 B2 | | 7/2006 | Wilton et al. |
| 7,225,150 B2 | | 5/2007 | Wilton et al. |
| 7,529,704 B1 | * | 5/2009 | Breslow et al. ................. 705/37 |
| 7,536,354 B1 | * | 5/2009 | deGroeve et al. ............... 705/54 |
| 7,822,672 B2 | * | 10/2010 | Hausman ........................ 705/37 |
| 2002/0143689 A1 | * | 10/2002 | Naylor et al. ................... 705/37 |
| 2003/0033239 A1 | * | 2/2003 | Gilbert et al. ................... 705/37 |
| 2003/0200167 A1 | * | 10/2003 | Kemp et al. ..................... 705/37 |
| 2006/0053074 A1 | | 3/2006 | Wilton et al. |
| 2008/0185975 A1 | | 8/2008 | Chen et al. |

FOREIGN PATENT DOCUMENTS

| | | |
|---|---|---|
| WO | 95/26005 | 9/1995 |
| WO | 01/09757 A2 | 2/2001 |
| WO | 01/33316 A2 | 5/2001 |

(Continued)

OTHER PUBLICATIONS

Fan M. et al: "A Web-Based Financial Trading System" Computer, IEEE Service Center, Los Alamitos, CA, US, Apr. 1999, pp. 64-70.

(Continued)

*Primary Examiner* — James Vezeris
(74) *Attorney, Agent, or Firm* — Law Offices of Grady L. White, LLC

(57) ABSTRACT

Method and apparatus for trading financial assets, such as foreign exchange and money market instruments, commodities and securities. The invention, which may be accessed over an interconnected data communications network, such as the Internet, using a standard Web browser, as well as via a proprietary user interface, receives customer requirements, automatically combines and organizes those requirements into a batch of orders according to a set of customer preferences, and displays the batch of orders to the customer, along with indicative or actual price quotes, such that the customer may select and process multiple orders and multiple requirements simultaneously. Orders are priced and booked automatically.

63 Claims, 12 Drawing Sheets

FOREIGN PATENT DOCUMENTS

WO 01/77942 A1 10/2001

OTHER PUBLICATIONS

Berkely III AR: NASDAQ's Technology Floor: Its President Takes Stock: IEEE Spectrum, IEEE Inc., New York, US vol. 34, No. 2, Feb. 1997, pp. 66-67.

Burmistrov IV: "Developing a workstation for stocktraders" Humans Interfaces in Control Rooms, Cockpits and Command Centres, 1999. International Conference on Bath, UK Jun. 21-23, 1999, London, UK, IEE, UK, Jun. 21, 1999, pp. 298-301.

* cited by examiner

METHOD AND APPARATUS FOR TRADING ASSETS

RELATED APPLICATIONS

This application is related to and claims priority under 35 U.S.C. §119 to provisional application No. 60/424,682, filed on Nov. 8, 2002, which is incorporated into this application in its entirety by this reference.

FIELD OF ART

The present invention relates generally to financial transaction systems and, more specifically, to financial transaction systems where at least a portion of the transaction is conducted over an interconnected data communications network, such as the Internet.

RELATED ART

In today's global market, money flows freely between investors and borrowers, and buyers and sellers, across international borders. Foreign exchange ("FX") markets, for example, allow market participants to exchange (or "trade") one currency for another. In an FX transaction, one counterparty buys a specified currency from the other counterparty in exchange for another currency. FX market instruments include, for example, spot, forward and swap agreements (defined below).

In another example, money markets allow market participants to borrow and lend money. In a money market transaction, one counterparty—the borrower—borrows money from the other counterparty—the lender—at a specified rate for a specified period of time. Money market instruments include coupon bearing instruments, such as certificates of deposit (CDs) and repurchase agreements, discount instruments, such as treasury bills, (T-bills) and commercial paper, and derivatives, such as forward rate agreements, interest rate futures and interest rate options.

As investments, most FX instruments and money market instruments are "liquid," meaning that they can be bought and sold, and therefore, converted to cash, rapidly. This liquidity is the reason many corporate treasurers use these markets to lend or sell spare cash to banks as a way of temporarily "parking" the spare cash in a short-term low-risk investment vehicle before making a financial decision. The banks use the spare cash to make loans to borrowers who need short-term financing. These borrowers may include, for example, other banks, corporations and governments, as well as supranational organizations, such as the World Bank.

Borrowers, lenders, sellers and buyers in these markets conduct their transactions through dealers, also called "traders," who borrow and lend money market instruments or buy and sell FX instruments. The dealers and traders, who are referred to as "market-makers" or "liquidity providers," quote prices that they are willing to buy (or borrow) the instruments they deal in, as well as prices they are willing to sell (or lend) the instrument. The borrowing or buying price is known as the "bid," and the lending or selling price is known as the "offer." The difference between these two prices is known as the "bid-offer spread," and it is this spread which generates profits for market-makers, as they are always buying and borrowing slightly more cheaply than they are selling and lending.

For years, liquidity providers and their customers (the buyers, sellers, lenders and borrowers who do business with liquidity providers) would negotiate, execute, confirm and settle transactions, which are often called "deals," from start to finish using only manual systems, either by meeting in person (such as at a stock or commodity exchange) or by using telephones and fax machines. But as the markets have grown, and as trading and dealing activities have expanded to cover 24 hours per day, the manual systems have been found to be too slow and inefficient to keep up with market requirements. Manual systems, for example, do not always provide adequate access to the people, prices and transaction records required to accommodate the fast pace and higher volumes of today's markets, or to deal with the financial risks associated with engaging in these transactions. Manual systems also typically do not provide adequate or timely access to current market news, market rates, market research and other information market participants need to have available and at their fingertips while they are making deals.

Automated online transaction systems for customers and liquidity providers have been introduced in an attempt to address some of these problems. But the existing automated systems have so far failed to solve many of the most time-consuming aspects of the older manual systems. For example, existing online transaction systems allow a customer, such as an asset manager, to view on an electronic blotter quotes provided by a counterparty, such as a bank, for a large number of outstanding financial requirements. Each financial requirement may comprise, for example, a proposal to exchange one currency for another currency on a specified date in the future (e.g., an offer to buy a million euros in the equivalent amount of U.S. dollars for settlement on Jan. 2, 2004). In some situations, the customer may have on his or her blotter and need to deal with, for instance, as many as two-hundred different quotes for two-hundred different proposed deals. A few of these deals may have significant financial value (e.g., a quote responsive to a proposal to trade 50 million U.S. dollars against euros) and, accordingly, may represent a significant financial stake or risk for the customer. A customer will typically want to consider each one of these significantly valuable requirements and quotes very carefully and process each one an individual basis.

In many situations, however, the customer's electronic blotter may also contain a large number of quotes for relatively minor deals. These deals may be considered relatively minor, for example, because they represent only a small financial risk to the customer (e.g., a proposal to buy only $10,000 worth of Japanese yen). These smaller deals, often referred to as "housekeeping" deals, may arise or result, for example, from dividend payments coming due, from hedges previously applied that now need adjustment, from fluctuations in asset value due to changing exchange rates. Thus, the customer may be faced with having to respond to a large number of quotes received for a large number of proposed deals, each deal being of a relatively small value. Deals of this size typically do not warrant the careful and individual consideration and processing required for the higher value deals. However, the customer still has to respond to each and every quote, regardless of its value. Faced with possibly hundreds of housekeeping deals that need to be processed, customers typically just want to get them done quickly, so they can then dedicate their time and resources to considering and processing the higher value deals.

In some cases, however, customers may not need to dedicate a lot of time and resources to processing or completing high value deals. Such cases might arise, for example, when the particular fund to be traded on can only be traded with a single bank, when the customer and the counterparty have a general agreement as to the quality of pricing that the bank will return (e.g. to use a fixed spread off a market reference), and so forth. In these cases, the customer cannot, or does not need to trade in competition, and, therefore, just wants to be able to quickly and efficiently get the deals done and out of the way so he can move on to considering deals that do warrant detailed consideration.

One disadvantage associated with conventional automated online transaction systems, however, is that they require that the customer separately process each and every deal (e.g., by accepting or denying the quotes). When there are a large number of relatively insignificant deals on the blotter, this process can be very time consuming. Responding to each deal can also be very expensive relative to the value of those deals to the customer because the customer typically has to pay a separate brokerage fee on each separately-processed deal.

Another disadvantage associated with existing automated online transaction systems is that each deal must be separately priced or confirmed by a sales person or other representative at the counterparty (typically a bank), which significantly increases the time required to fully process a large collection of small deals.

Accordingly, there is need for an automated online transaction system that allows customers to collectively process a number (i.e., a "batch") of deals quickly and efficiently with a minimum number of instructions, keystrokes or mouse clicks. There is a further need for such systems to automatically arrange and compute "netted values" for multiple deals. "Netting" transactions means combining multiple payments arising from different transactions into a single, equivalent payment, thereby reducing the number of payments between the parties and, in most cases, reducing the overall transaction cost associated with completing multiple transactions. These systems would be even more useful if they were capable of collectively processing the batch according to a set of preferences associated with the customer, counterparty bank, or both of them, and also took into account the customer's credit profile and governmental or industry regulations and restrictions. These systems would be even more useful if they included components and/or processors for quoting, confirming and settling batches of deals automatically, with little or no human intervention required at the counterparty bank or provider.

SUMMARY OF THE INVENTION

The present invention addresses the above described and other disadvantages associated with existing automated online transaction systems by providing systems and methods for automatically processing (e.g., submitting, quoting, accepting, booking, confirming and settling) multiple deals in a batched manner. The invention further provides that the batches may be processed according to a set of default or specified preferences associated with the customer, the counterparty, governmental or industry standards and regulations, or all of the above.

In general, the present invention comprises a method of trading assets comprising the steps of: (1) establishing a communications channel with a customer; (2) receiving a set of requirements from the customer via the communications channel; (3) arranging the set of requirements to form a batch of orders, each order in the batch comprising a subset of the set of requirements; (4) automatically providing a quote for at least one order in the batch, the quote comprising a price for executing a group of trades, each trade in the group corresponding to a requirement in the order; (5) presenting the quote to the customer via the communications channel; (6) receiving an acceptance for the quote from the customer via the communications channel; and (7) responsive to the acceptance, booking the group of trades.

When the set of requirements comprises at least two requirements having in common between them a particular currency pair, bank account or value date, the arranging step may further include assigning these requirements to the same order in the batch of orders. Preferably, a netted value for the two requirements is then computed and displayed to the customer for approval or rejection. These requirements may or may not have the same dealt currency (defined below). The mechanics of computing netted values for requirements are described in the detailed description section below in conjunction with the detailed description of an exemplary batch management server component of one embodiment of the present invention.

The subset of requirements may include, for example, a proposal to exchange one currency for another currency, a proposal to lend or borrow a sum of money, a proposal to buy or sell a commodity or a proposal to buy or sell a security. The group of trades may comprise any number of trades, including just one trade, as required to satisfy all of the requirements in the order (or orders) automatically quoted. In some embodiments of the invention, the method further includes the steps of generating and displaying one or more indicative prices for executing one or more trades in the group of trades. An indicative price engine may be used to generate the indicative prices.

As stated above, the invention may be applied in a variety of different asset trading contexts, including but not limited to trading foreign exchange and money market assets, commodities and securities. In the context of trading foreign exchange assets, a "requirement" is an individual foreign exchange proposal (e.g., "I would like to buy 1 million euros in U.S. dollars for settlement on Jan. 2, 2004, in bank account number 12345"). An "order" comprises a set of one or more requirements sent to a counterparty (usually a bank) to be collectively priced or executed as a unit. In other words, when the bank provides a quote on the order, the bank is essentially offering to provide the requirements at the stated price, so long as the customer agrees to trade on all of the requirements in the order. Thus, after receiving a quote on an order, the customer cannot then choose to trade on only some of the requirements in the order. The customer may trade on all of the requirements in the order to get the quoted price, or none of them. A "batch" is a set of one or more orders, which can be collectively priced and/or executed substantially simultaneously using a minimum of instructions, keystrokes or mouse clicks. Once the customer has received price quotes on a batch of orders, the customer may elect to trade on one order, more than one order, all of them or none of them.

In preferred embodiments, the present invention further comprises the step of receiving from the customer, via the communications channel, a request to provide the quote, also known as a "request for quote" or "RFQ." The method may further include the steps of executing the group of trades and sending a notice to the customer, via the communications channel, indicating that the group of trades has been executed. Trade details associated with the group of trades may then be stored in a transaction database configured to hold such information. Preferably, although not necessarily, the method includes the subsequent steps of matching, confirming, settling, outsourcing and/or amending one or more trades in the group of trades based on corresponding sets of trade details stored in this transaction database.

Preferred embodiments of the invention also include arranging the set of requirements according to a default set of preferences associated with the customer. The invention also allows the user to override the default set of preferences and create one or more arbitrary orders from the set of requirements (i.e., the customer manually instructs the system to combine into a single order requirements that would not be combined if the default set of preferences were used). The customer may also instruct the system to delete requirements from an order, move a requirement from one order to another, or the combine two orders in the batch to form new order. Accordingly, the method may further include receiving an instruction from the customer, via the communications channel, to use or modify the default set of preferences, or to modify the default arrangement of requirements in any or all orders. The set of preferences may include, for example, a maximum or a minimum value for an individual order, a preferred set of accounts or counterparty banks to use, a preferred set of currencies or settlement dates, etc.

The invention may also be used to collectively trade requirements involving assets from different classes. For instance, a customer may be interested in buying a security sold on a foreign securities market. But he must first convert his domestic currency (e.g., U.S. dollars) into the currency accepted by that foreign market (e.g., yen). Thus, the set of requirements may include both a proposal to buy or sell a security (a securities asset class) and a proposal to exchange one currency for another currency (a foreign exchange asset class). In this case, the arranging step may include assigning the securities requirement and the foreign exchange requirement to the same order and computing a netted value for the two requirements, even though they are not in the same asset class.

In addition to automatically generating a quote for an order in the batch, or as an alternative to it, the invention may be used to automatically generate quotes for every order in the batch, resulting in a collection of quotes for a collection of orders. Thus, according to principles of the invention, a customer may elect to collectively process all of the requirements in one order in the batch, all of the requirements in multiple orders in the batch, or all of the requirements in all of the orders in the batch. Collectively processing requirements means, for example, requesting indicative prices or quotes for all of the requirements in one or more orders, requesting that all of the requirements in one or more orders be sent to a preferred counterparty, requesting that all of the requirements in one or more orders be sent to a plurality of preferred counterparties, instructing the system to accept the prices quoted on all of the requirements in one or more orders, etc.

In some cases, the customer may instruct the system, through a series of instructions, keystrokes or mouse clicks on a user input screen, for example, to send one or more orders to a counterparty along with a signal (flag or other indicator) to indicate to the counterparty that the one or more orders being sent contain one or more details associated with a prior transaction between the customer and the counterparty. The prior transaction may have been partially or fully executed, for instance, in a face-to-face meeting between the customer and the counterparty, on or over an automated online transaction system, or through a telephone or facsimile connection. Typically, although not necessarily, the customer instructs the system to send the order along with this signal or flag when it is necessary or desirable for the counterparty to provide a missing or additional term to complete the quote prior to booking and/or execution of a trade.

For foreign exchange orders, for example, a customer and provider may have already traded, in a prior transaction conducted over the telephone, the netted spot position of all of the requirements in an order of the prior transaction. The netted spot position refers to the net amount of currency traded by the parties, based on a computed netted value for all of the requirements in the order of the prior transaction. Thus, the signal, flag or other indicator would be used, for example, to indicate to the provider that the current order contains the amounts for each value date for each requirement in the order of the prior transaction. In another case, the customer may set the flag (or cause the flag to be set) to signal the provider that the current order contains other details needed to complete the order of the prior transaction, such as account numbers and value dates for each requirement in the order of the prior transaction. Typically, the provider will then provide prices for any non-spot value dates to complete the quote.

In accordance with some embodiments, the invention also includes the steps of establishing a second communications channel with a counterparty, presenting the order to the counterparty via the second communications channel and receiving the quote from the counterparty, via the second communications channel. In this embodiment, the method also may optionally include the steps of transmitting the acceptance to the counterparty via the second communications channel, receiving a confirmation from the counterparty responsive to the acceptance and sending the confirmation to the customer via the first communications channel. Another option includes the step of sending a notice to the counterparty, via the second communications channel, indicating that the group of trades has been booked.

In another aspect of the present invention, there is provided another method of trading assets, comprising: (1) establishing a communications channel with a customer; (2) receiving a set of requirements from the customer via the communications channel; (3) arranging the set of requirements to form a batch of orders, each order in the batch comprising a subset of requirements in the set of requirements; (4) receiving from the customer a request to book an order in the batch; (5) booking the group of trades in response to the request, each trade in the group corresponding to a requirement in the order; and (6) transmitting to the customer a booking detail associated with the group of trades. The booking detail may comprise for example, execution, pricing, account or value date information, which may be transmitted to the customer via the communications channel established with the customer or through some other means, such as by telephone, facsimile or electronic mail.

This aspect of the invention does not necessarily include the steps of requesting or providing pricing information, such as indicative prices or quotes, to the customer before the group of trades is booked. The trades may be automatically booked or executed, preferably in accordance with a set of trading rules or customer preferences, in response to the customer providing the set of requirements. Such trades may be booked or executed by the bank, based on an understanding with the customer that the provider will give the customer the best price available. The method may further include the steps of sending a notice to the customer indicating that the group of trades has been executed and providing execution details to the customer. Preferably, execution details associated with the group of trades are stored in a database, where they may be retrieved for further processing, such as matching and confirming the details of trades booked on behalf of the customer with the details of trades booked on behalf of the counterparty.

In still another aspect of the invention, there is provided a method of interacting with a computer system so as to trade assets, comprising: (1) launching an order management system that includes a command to establish a communications channel with the computer system; (2) providing a set of requirements to the computer system via the order management system; (3) invoking a command in the order management system so as to cause the computer system to generate a batch of orders, each order in the batch comprising a subset of requirements from the set of requirements; (4) selecting a control in the order management system so as to cause the computer system to provide a quote for collectively executing a group of trades to fulfill every requirement in at least one order in the batch; and (5) issuing an instruction, via the order management system, to accept the quote. In a preferred embodiment, the method may further comprise the steps of: (6) executing a command in the order management system to provide a set of preferences associated with the group of trades, (7) selecting another control (such as a button or check box in a graphical user interface) configured to cause the computer system to send the order to a counterparty.

According to another aspect of the present invention, an asset trading system is provided, which comprises: (1) a communications channel for receiving a set of requirements from a customer; (2) a batch manager configured to arrange the set of requirements into a batch of orders, each order in the batch comprising a subset of requirements from the set of requirements; (3) a trading server configured to provide a quote for an order in the batch, the quote comprising a price for executing a group of trades, each trade in the group corresponding to a requirement in the order; and (4) a user interface configured to present the quote to the customer, via the communications channel, and to receive an acceptance for the quote from the customer via the communications channel. The trading server is further configured to book the group of trades in response to the acceptance received by the user interface.

In some embodiments, the batch manager is configured to arrange the set of requirements according to a set of preferences. The user interface is further configured, in preferred embodiments, to receive from the customer, via the communications channel, a request to provide the quote, to send a notice to the customer, via the communications channel, indicating that the group of trades has been executed, and to receive an instruction from the customer, via the communications channel, to modify the set of preferences or the default arrangement of requirements in one or more orders. The user interface may also be configured to receive from the customer a request to send the order to a particular counterparty or group of counterparties. The set of preferences may be stored, according to principles of the present invention, in an optional administrative server configured for this purpose. Moreover, the trading server may be further configured to execute the group of trades.

In practice, a system configured to operate according the present invention also includes netting functionality, so that when the set of requirements comprises at least two requirements having in common between them a particular currency pair, a particular account or a particular value date, the batch manager will assign the at least two requirements to the same order and compute a netted value for those two requirements. Such netting functionality may be implemented in cases where the requirements do not have the same dealt currency, as well as cases where they do have the same dealt currency. Further still, the batch manager also may be configured, in preferred embodiments, to combine and compute the netted value of requirements having mixed asset classes (e.g., where one requirement calls for a currency exchange and another requirement calls for buying or selling a security).

The system optionally includes an indicative price engine configured to generate indicative prices for executing the group of trades, so that the customer may obtain useful pricing information about state of the market for the submitted requirements prior to requesting and/or obtaining actual quotes from counterparties. The indicative price engine may or may not be coupled directly to the batch manager, user interface or trading server.

As stated above with respect to the inventive methods of the present invention, the customer may elect to collectively process a single order in the batch, multiple orders in the batch, or all orders in the batch. Therefore, the batch manager in a system configured to operate in accordance with the present invention is further configured to produce a collection of quotes for a batch, one quote for every order in the batch. In addition, the user interface may be configured to present the collection of quotes to the customer via the communications channel, and to receive from the customer, via the communications channel, an instruction to accept the collection of quotes. With this functionality, the customer may quickly and efficiently instruct the system to quote, book and/or execute an entire batch of requirements.

The system optionally includes a second communications channel, coupled to the trading server, configured to convey the order from the trading server to a counterparty, to convey the quote from the counterparty to the trading server, and to convey the acceptance from the trading server to the counterparty. The second communications channel may also provide the conduit for conveying a confirmation responsive to the acceptance from the counterparty to the trading server, which is typically sent to the customer through the user interface.

In each of the embodiments of the present invention described herein, the communications channel may comprise, for example, an Internet connection, a wide area network connection, a local area network connection, a telephone connection, or some combination of one or all of the above-listed types of connections.

In some embodiments of the present invention, the system may further include an order management system configured to receive input directly from the customer under the control of the user interface server, as well as a straight-though processing ("STP") adapter. An STP adapter typically comprises one or more pieces of hardware, software, or both, which is configured to convert requirements from one standard or proprietary format to another in order to provide seamless, automated, electronic transfer of trade information to all parties involved in the trading cycle. On the counterparty side, a system configured to operate according the principles of the present invention also may include a counterparty trade management system configured to receive input directly from the counterparty under the control of the trading server. The trade management system also may include and/or be coupled to a rate engine configured to generate the actual price for each requirement in the set of requirements.

Finally, in preferred embodiments of this aspect of the invention, the system includes a security server configured according to methods well-known in the industry to prevent unauthorized access to the user interface server, batch manager server and trading server. Typically, the security server will be coupled to a security database comprising security-related data associated with customers, banks, brokers and other providers.

In still another aspect of the present invention, there is provided a user interface for trading assets on a computer system. The user interface is invocable by an order management system, and comprises two display screens, which may or may not be visible simultaneously. The first display screen is configured to receive input including a set of requirements, from a customer. The second display screen, on the other hand, is configured to display, responsive to the input received from the first display screen, a batch of orders, each order in the batch comprising a subset of requirements from the set of requirements, a quote for each order in the batch, each quote comprising a price for executing a group of trades, each trade in the group corresponding to a requirement in the subset of requirements, and a user-activatible control configured to cause the computer system to collectively execute the group of trades. The orders, as displayed by the user interface in this aspect of the invention, may comprise all of the requirements in the set of requirements having a particular currency pair, all of the requirements in the set of requirements associated with a particular account, all of the requirements in the set of requirements having a particular value date, or some combination of each of the above.

Thus, it is a feature of the present invention that it allows customers to process multiple requirements in a batched manner so that the customer may dispose of multiple requirements as quickly and efficiently as possible. The requirements may represent large value deals, small value deals, or any size deal in between. It is another feature that it provides a user interface that invokes such processing with a minimal number of required instructions, keystrokes and mouse clicks from the customer. It is a further feature that, once the batch-mode processing is invoked by the customer, the system may automatically provide indicative prices, quotes, trade bookings, trade executions, or some combination thereof with little or no human intervention on the part of the transaction counterparty.

Together, all of these features provide significant advantages over existing automated online transaction systems in terms of time, effort and costs associated with processing trading requirements in a variety of different contexts.

BRIEF DESCRIPTION OF THE DRAWINGS

The present invention and various aspects, features and advantages thereof are explained in detail below with reference to exemplary, and therefore non-limiting embodiments and with the aid of the drawings, which constitute a part of this specification and include exemplary embodiments of some of the various forms of the invention. In these drawings:

In FIGS. 4 through 8, the orders are "netted" across requirements that have the same currency pair and the same dealt currencies. In FIGS. 9 through 12, however, the orders are "netted" across requirements that have the same currency pair and different dealt currencies.

DETAILED DESCRIPTION OF THE PREFERRED EMBODIMENTS

Figure 1:
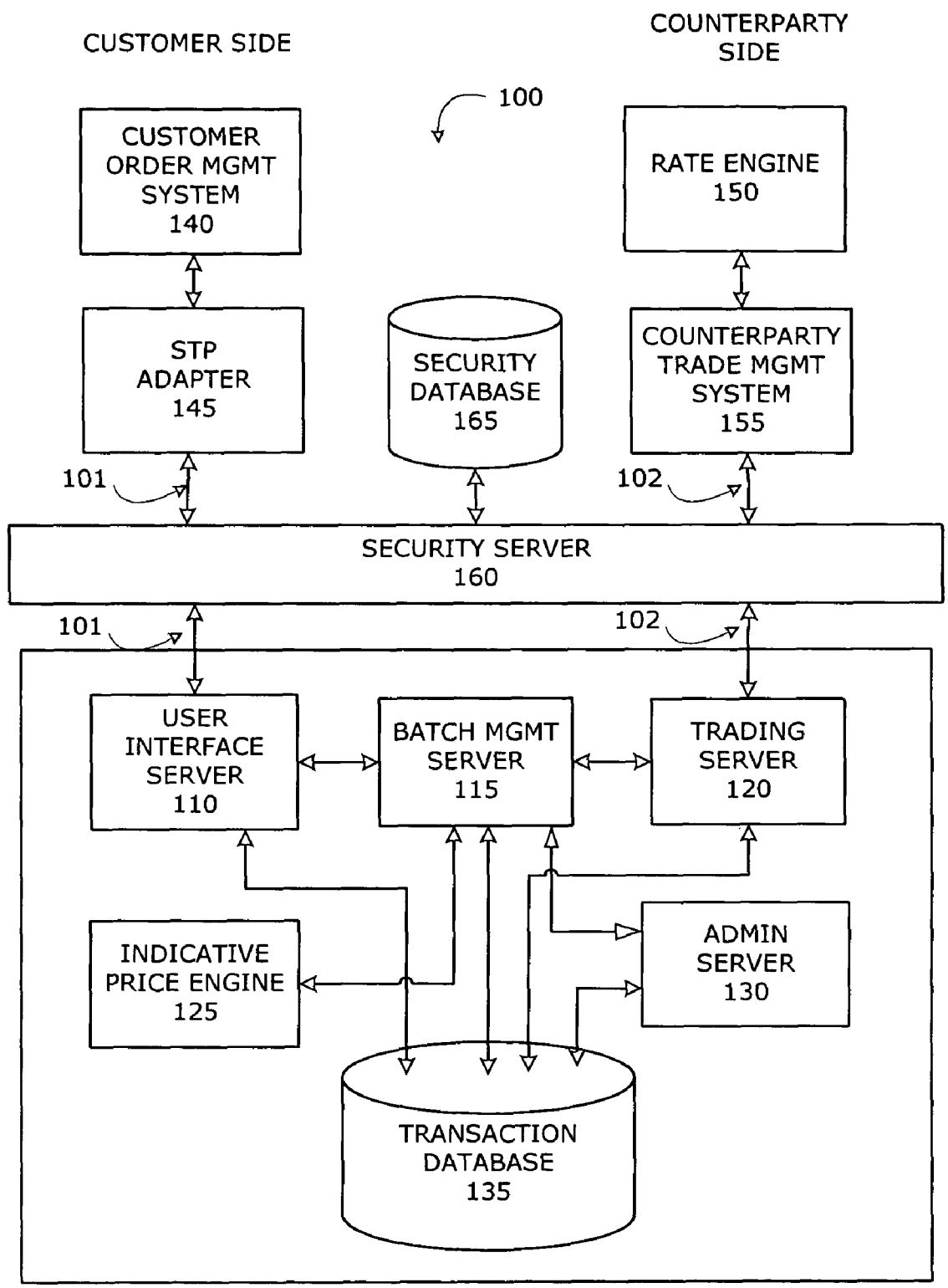
FIG. 1 shows a high-level block diagram of an asset trading system configured to operate in accordance with the present invention.

Although the detailed description of preferred embodiments provided herein refers primarily to foreign exchange (FX) deals, these references are only meant to illustrate in clearer detail how the invention may be applied in that particular context, not to serve as a limitation on the applicability of the invention in other contexts. Therefore, such references should not be construed to mean that other kinds of financial transactions, such as money market, commodity and security transactions, are outside the scope of the claimed invention.

Definition of Terms

As used in this description, except to the extent that the context indicates otherwise, the following terms may be understood with reference to the definitions provided below.

FX Terms

A "foreign exchange" or "FX" transaction (or "deal") is a contract to exchange one currency for another at an agreed rate on a specified delivery date, also called a "value date."

A "value date" or "settlement date" is the date on which the exchange of currencies will take place.

The terms "FX spot deal," "spot trade" and "spot agreement" refer to a transaction or agreement to exchange a single foreign currency for another (i.e., to buy X units of one currency, sell Y units of another currency) on the FX spot date.

The "FX spot date" is usually two working days from the date the agreement is made and is the most liquid (i.e. cheapest) date to buy or sell currency on a given trading date.

The term "swap" or "swap agreement" refers to a deal involving the simultaneous purchase and sale, or sale and purchase, of a specified amount of one currency against another for two different value dates. Although a swap is a single transaction with a single counterparty, the transaction has two value dates (or "legs") when the exchanges of funds occur.

A "spot rate" is a rate (expressed as combination of a bid (buy) price and an offer (sell) price) at which a market maker will buy and sell the base currency against another currency.

The term "All-in rate" typically refers, in the context of outrights, to the overall rate at which the exchange will occur. The all-in rate is calculated by adding the spot rate and the FX points (the price adjustment).

A "single spot portfolio" (SSP) is an FX deal involving one or more legs in a single currency pair on any combination of value dates. The dealt currency should be the same for all legs. SSP price quotes typically have four components: a spot rate, the FX points for each of the non-spot value dates, and the all-in rates for each of the non-spot value dates.

A "multiple spot portfolio" or "multi-spot portfolio" (MSP) is an FX deal involving one or more legs in multiple currency pairs on any combination of value dates. The dealt currency is not the same for all legs.

Parties

The term "Provider" is typically a shorthand reference to a "Liquidity Provider." A "Liquidity Provider" is typically a financial institution, such as a bank, that serves as a market maker in a trading system. Liquidity Providers quote prices in response to requests from "customers."

The term "bank," as used herein, is typically used interchangeably with "Provider."

The term "dealer" or "trader" typically refers to an employee of the bank or Liquidity Provider who monitors the system from the Provider side and responds to customers' requests for price quotes.

The term "customer" typically refers to a user of the system who is not a bank, provider, dealer or trader. Customers initiate the dealing process by asking one or more Providers for a price on a particular FX instrument, such as a swap, forward or spot transaction. While "customer" is typically essentially interchangeable with "user," in some cases, depending on the context, a "customer" may also refer to an aggregation of users, as, for example, in a company.

Miscellaneous Concepts

The term "Straight-through-Processing" refers to the end-to-end automation of the trading process from order to settlement. It involves the seamless, automated, electronic transfer of trade information to all parties involved in the trading cycle as early as possible.

The term "dealt currency" is a foreign exchange term that refers to the fixed currency in a foreign exchange proposal or quote. For example, if a foreign exchange market participant proposes or quotes a deal to exchange 1 million euros for the equivalent amount of U.S. dollars, then the deal entails trading a fixed amount of euros against a variable amount of U.S. dollars. The amount of U.S. dollars depends on the exchange rate. Thus, the dealt currency in this transaction, also referred to as the "base currency," is euros. The U.S. dollar, on the other hand, is referred to as the "counter currency."

The terms "netting," "netted spot position" and "computing a netted value" refer to the process of combining multiple payments arising from different transactions into a single, equivalent payment. Netting multiple transactions, requirements or deals usually simplifies the settlement process and reduces transaction costs.

Acronyms

API—Application Programmer Interface. Used colloquially without expansion to denote a computer-to-computer interface.

OMS—Order Management System. An Order Management System is used by a Customer to maintain a record of which FX that deals need to be executed in the market, who should execute them, etc. Once a deal is executed, the OMS is typically updated with the execution rate for each deal.

SSP—Single Spot Portfolio. A foreign exchange transaction or "deal" involving multiple value dates for a single currency pair. The Provider quotes a single spot rate (hence the name) together with FX points for each value date.

MSP—Multiple Spot Portfolio. A foreign exchange transaction or "deal" involving multiple value dates for multiple currency pairs.

RFQ—Request For Quote. A trading protocol whereby the customer initiates a trade by asking for a price on a particular currency pair, value date, and amount. The bank responds by sending a price (i.e., a quote) back to the customer. In order to accept the price, the customer typically sends the provider an acceptance or an "Offer to Deal."

USD—United States Dollars.
GBP—United Kingdom Sterling
JPY—Japanese Yen
CHF—Swiss Franc
EUR—European Euro
CAD—Canadian Dollars
NOK—Norwegian Kroner High-Level Architecture Description FIG. 1 shows a high-level block diagram of a asset trading system configured to operate in accordance with the present invention. As shown in FIG. 1, a computer system 100, according to the principles of the present invention, comprises a user interface server 110, a batch management server 115, a trading server 120, an indicative price engine 125, an admin server 130 and a transaction database 135. As shown in FIG. 1, and described in more detail below, an asset trading system configured to operate in accordance with the present invention may also include a security server 160 and a security database 165, as well as a customer order management system 140, a straight-through-processing (STP) adapter 145, a rate engine 150 and a counterparty trade management system 155.

Customer order management system 140 typically comprises a standard or proprietary program or processor configured to accept customer input, such as a list of foreign exchange requirements. Customer order management system 140 also may comprise, for example, an ordinary spreadsheet suitable for importing and exporting requirements by means of simple cutting and pasting commands well known to users of modern computer systems. Customer input may be provided on customer order management system 140 via user input screens, fields, buttons and controls manipulated by keyboard keystrokes, mice and other computer input devices. STP adapter 145 serves as a translator of sorts, as it is configured to convert requirements and messages from one format to another as those requirements and messages are moved from the customer order management system to the user interface server, and vice versa.

User interface server 110 is configured to establish an online connection (e.g., an Internet connection) with one or more customer-side applications, such as customer order management system 140 and STP adapter 145, via link 101. User interface server 110 is also configured by well-known methods to generate and transmit input and output screen images (e.g., Hyper-Text Markup Language web pages) to the customer-side applications via link 101. User interface server 110 also receives input and instructions (typically in the form of mouse clicks and key strokes) from the customer, and passes such input and instructions to the appropriate system component (e.g, the batch management server 115, trading server 120 or transaction database 135) for further processing.

Batch management server 115 combines, collates and/or arranges requirements submitted by the customer via online connection 101 and user interface server 110 into a batch of one or more orders, each order containing one or more of the requirements. Preferably, although not necessarily, batch management server 115 carries out these operations according to a set of default preferences or profiles stored in admin server 130, or otherwise provided by the customer along with the requirements. In a preferred embodiment, batch management server 115 also computes netted values for requirements having in common between them the same currency pairs, the same accounts and/or the same value dates.

The mechanics of the netting process are typically defined by a netting agreement between the customer and counterparty. A typical process is for the two parties to review cash flows scheduled for the same bank account on the same value date and agree to exchange only a net payment. Note that the underlying deals that generated the scheduled payments may have been executed on different dates. Once the net payment amounts have been agreed, any new trades must be settled separately, or the initial net payment schedule must be undone. If there are several such trades, they can likewise be netted together into a single payment, but the original netted payment remains unchanged.

Table 1 below illustrates by example one of the advantages of netting payments for trade requirements having the same currency pair before executing and booking the trades.

TABLE 1

NETTING TRADES WITH SAME CURRENCY PAIR

Requirements:

ACCT1 needs to buy 100,000 EUR vs USD (dealt currency = EUR)
ACCT2 needs to sell 200,000 EUR vs USD (dealt currency = EUR)
Current Market Rate:

1.1766-1.1769 (bank buys EURs at $1.1766/EUR and sells EUR at $1.1769/EUR)
Without netting:

Customer pays 100,000 * 1.1769 = $117,690 to buy 100,000 EUR for ACCT1
Customer receives 200,000 * 1.1766 = $235,320 to sell 200,000 EUR for ACCT2
Result: Customer receives $117,630 ($235,320 − $117690) in exchange for 100,000 EUR
With netting:

Net requirement is to sell 100,000 EUR vs USD
Result: Customer receives $117,660 ($100,000 * 1.1766) in exchange for 100,000 EUR As shown in Table 1, the customer saves $30 ($117,660-$117,630) by trading the two requirements on a netted basis instead of trading them separately.

Table 1, above, shows the results of netting two requirements that specify the same dealt currency (in this case, euros). Requirements having the same currency pair, however, may be netted even if they do not have the same dealt currency. This process is called "intra-currency pair netting." Table 2 below illustrates by example the advantage of intra-currency pair netting.

TABLE 2

NETTING TRADES WITH DIFFERENT DEALT CURRENCIES

Requirements:

ACCT1 needs to buy 100,000 EUR vs USD (dealt currency = EUR)
ACCT2 needs to buy 200,000 USD vs EUR (dealt currency = USD)
Current Market Rate:

1.1766-1.1769 (bank buys EURs at $1.1766/EUR and sells EUR at $1.1769/EUR)
Without netting:

Customer pays 100,000 * 1.1769 = $117,690 to buy 100,000 EUR for ACCT1
Customer pays 200,000/1.1766 = EUR 169,981 to buy 200,000 USD for ACCT2
Result: Customer receives $82,310 ($200,000 − $117,690) and pays EUR 69,981 (EUR 169,981 − EUR 100,000)
With netting:

Net requirement is to buy USD and sell EUR
Bank's rate for this transaction is 1.1766:

TABLE 2-continued

NETTING TRADES WITH DIFFERENT DEALT CURRENCIES

Customer pays 100,000 * 1.1766 = $117,660 to buy 100,000 EUR for ACCT1
Customer pays 200,000/1.1766 = EUR 169,981 to buy 200,000 USD for ACCT2
Result: Customer receives $82,340 ($200,000 − $117660) and pays EUR69,981 (EUR 169,981 − EUR 100,000)

As shown in Table 2, the customer again saves $30 by trading the two requirements on a netted basis instead of trading them separately.

With reference again to the system depicted in FIG. 1, batch management server 115 takes the requirements provided by the customer and, if necessary, rearranges, combines and nets the requirements contained in the set of requirements together. In a preferred embodiment, batch management server 115 also receives indicative prices for the requirements from indicative price engine 125. Typically, the batch of orders and indicative prices would then be presented to the customer by user interface server 110 using online connection 101, STP Adapter 145 and customer order management system 140. In response, the customer may request, for example by selecting one or more input controls on a display screen provided by the user interface server, that one or more orders in the batch be sent to a counterparty for quotes or execution. If the customer makes this request, batch management server 115 transfers the selected orders to trading server 120.

Trading server 120 receives the batch of orders (which, incidentally, may contain multiple orders from the batch, all of the orders, or only one order) and sends them to the counterparty-side components of the system via online connection 102. In a preferred embodiment, trading server 120 is coupled, via online connection 102, to counterparty trade management system 155, which comprises one or more application programs or processes that allow the counterparty (usually a provider bank) to receive and respond to orders, requests for quotes, etc. Thus, the counterparty may use counterparty trade management system 155, in accordance with principles of the present invention, to provide, among other things, quotes for new orders, price additions and adjustments for pending orders, and confirmations and trade details for booked and/or executed orders.

As illustrated in FIG. 1, embodiments of the present invention may also include a rate engine 150, typically coupled to counterparty trade management system 155, configured to automatically generate price quotes for requirements as they are received from trading server 120, thereby making it possible for the counterparty to instantly and constantly provide accurate and viable quotes for incoming orders without human intervention. Thus, the inclusion of rate engine 150 in the system typically reduces significantly the time required to propose, book and confirm an order comprising numerous requirements or a batch of orders.

In preferred embodiments, optional security server 160 prevents access to the system by unauthorized customers and providers. To facilitate and control these security measures, security server 160 may be coupled to a security database 165, which contains security-related data (e.g., names, account numbers, passwords, etc.) for each customer and each provider.

The preferred embodiment of the system also includes a transaction database 135 configured to store transaction messages and details associated with booked and/or executed trades. The system may further include hardware and/or software processors that utilize messages and details stored in transaction database 135 to implement post-execution-stage matching, confirmation, amendment, settlement and liquidity outsourcing functionality. This functionality may be achieved, for example, by combining the features of the present invention with the inventions and features described in co-pending application Ser. No. 10/463,866, entitled "METHOD AND APPARATUS FOR MANAGING FINANCIAL TRANSACTIONS INVOLVING MULTIPLE COUNTERPARTIES AND PROCESSING DATA PERTAINING THERETO," filed on Jun. 18, 2003, and application Ser. No. 10/237,980, entitled "METHOD AND APPARATUS FOR AMENDING FINANCIAL TRANSACTIONS," filed Sep. 10, 2002, both of which are assigned to the assignee of the present application, and which are hereby incorporated herein in their entirety by this reference.

Figure 2:
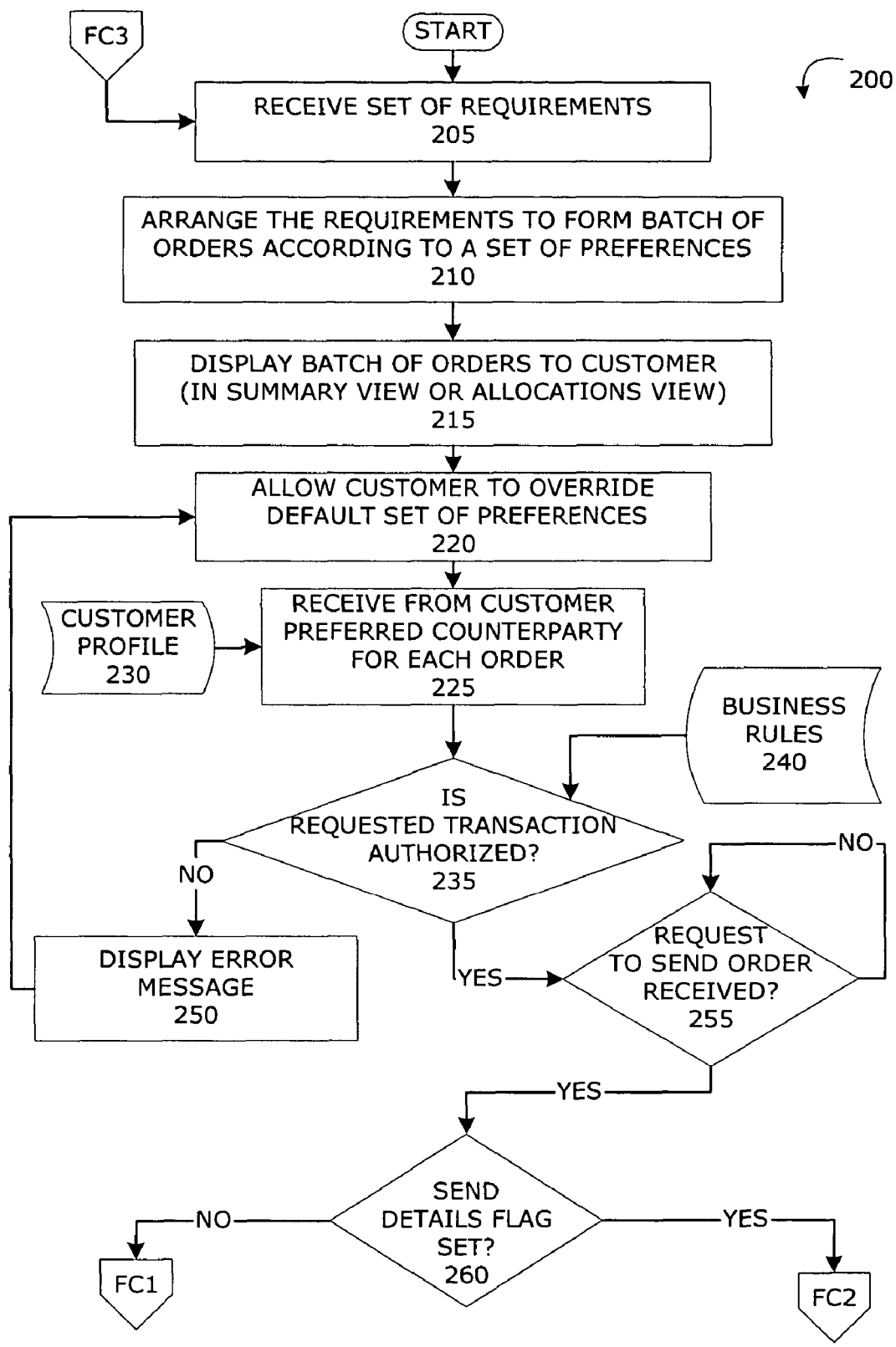
FIGS. 2 and 3 together contain a high-level flow diagram illustrating the steps that might be performed by an asset trading system, a computer system, a processor or combination of processors configured to operate in accordance with an embodiment of the present invention.
Figure 3:
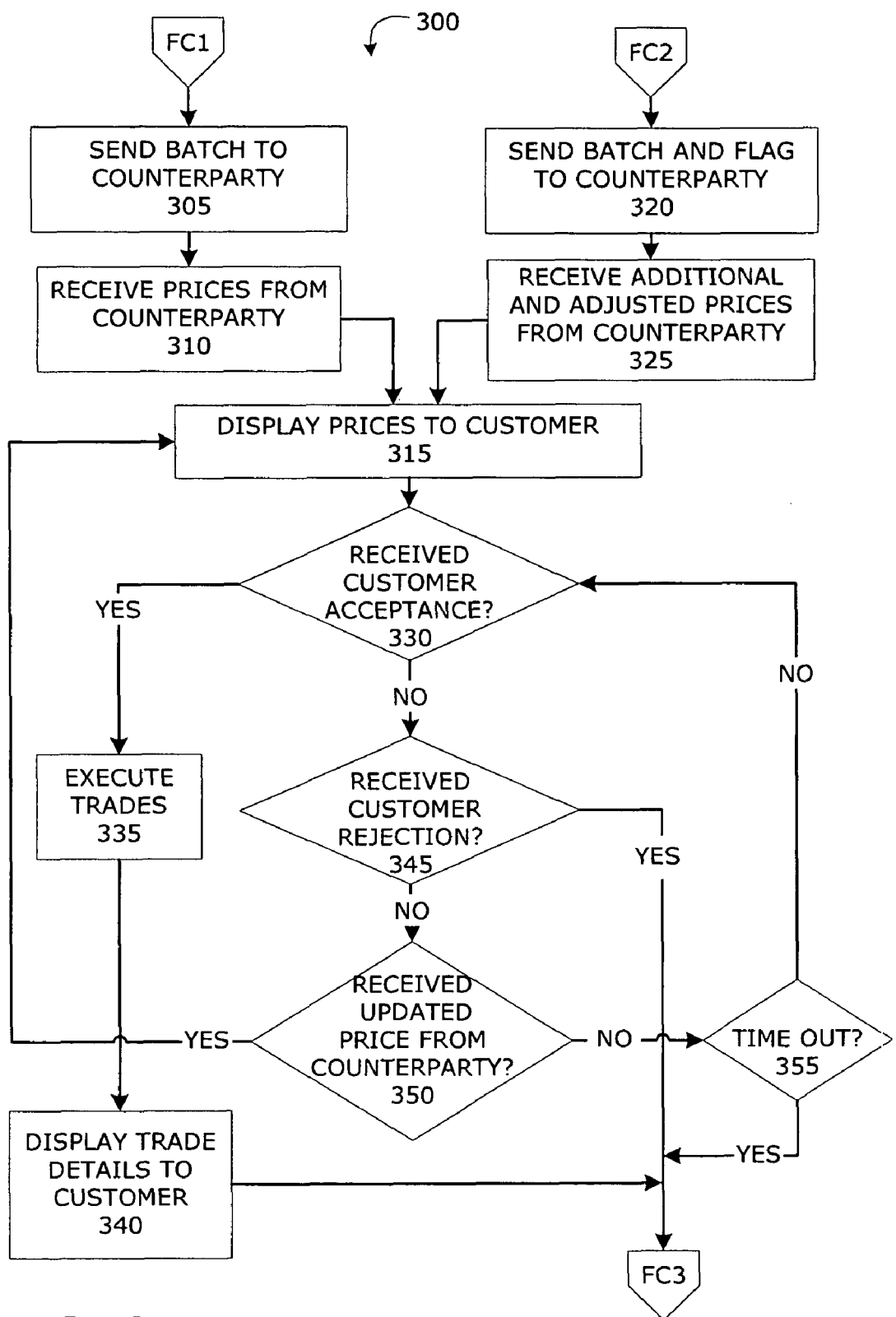

FIGS. 2 and 3 illustrate by way of a high-level flow diagram the steps that might be performed by an asset trading system configured to operate in accordance with an embodiment of the present invention, such as the system shown in FIG. 1, for example. As shown in FIG. 2, the process begins at step 205, where a set of requirements is received from the customer. Typically, the requirements will be imported, copied or manually typed into the system, or alternatively, transmitted to the system via a customer order management system (OMS) and STP adapter, as described above with reference to FIG. 1. At step 210, the set of requirements is arranged to form a batch of orders according to a default or specified set of preferences, such as minimum and maximum order totals, preferred banking accounts, value dates, etc. Each order in the batch comprises a subset of requirements from the set of requirements. The subset may comprise one requirement from the set of requirements, all of the requirements from the set of requirements, or any number in between.

Next, the batch of orders is displayed to the customer at step 215. The batch of orders may be displayed to the customer in a variety of ways and formats. Two such formats, referred to herein as the "Allocations View" and "Summary View" are discussed in detail below with reference to FIGS. 7, 8, 12 and 13. Preferably, the orders are displayed to the customer along with indicative prices in order to give the customer some idea of the current state of the market as it relates to the requirements the customer wishes to fulfill.

As shown at step 220, the system allows the customer to override the default set of preferences by specifying parameters such as a new maximum or minimum value for any order. In preferred embodiments, the customer may also choose at this point to move or exclude certain requirements from certain orders. Then, in step 225, the system receives from the customer information identifying one or more preferred counterparties. Such information also may be supplied by reference to a customer profile 230, which may reside, for example, in an administrative server component of the system, or, alternatively, may be provided manually along with the requirements.

At step 235, the system may refer to an optional administrative server component to determine whether the requested transaction is authorized under a set of business rules 240, such as, for example, credit limits defined by a counterparty bank, or government regulations, such as the Employee Retirement Income Security Act (ERISA). If the transaction is not authorized, an error message is displayed (step 250), and processing returns to step 220, where the customer will be allowed to make adjustments to the orders in order to bring them into compliance with the scope of authority provided by business rules 240. For example, if the order breaches a credit limit, the user may break the order into two smaller orders (a step 220 activity) and request that each order be sent to a different bank (a 225 activity).

If, on the other hand, it is determined at step 235, that the requested transaction is authorized under business rules 240, then the system, at step 255, determines whether a request to send the order to a counterparty for pricing has been received. If no such request has been received, then the system simply continues checking for such a request. If, however, a request to send the order to the provider has been received, then processing continues at step 260, where the system determines whether the customer also sent a signal or flag indicating that the order contains a detail relating to a previous transaction between the customer and the counter party. If the signal or flag is not sent, processing continues at step 305 of FIG. 3 by way of flow chart connector FC1, where the system sends the batch of orders to the selected counterparty (step 305) and receives from the counterparty prices for the orders (step 310). If, in step 260, it is determined that the signal or flag has been sent, then processing continues at step 320 of FIG. 3 by way of flow chart connection FC2, where the batch and flag are sent to the counterparty (step 320). At step 325, the system receives additional or adjusted prices from the counterparty to complete the order associated with a prior transaction between the counterparty and the customer.

Next, the system displays the prices for the order to the customer (step 315) and determines whether the customer has accepted or rejected the prices (steps 330 and 345, respectively). If an acceptance is received in step 330, then one or more trades corresponding to the requirements in the order are executed (step 335) and certain trade details, such as account balances, are displayed to the customer (step 340). Processing then returns to the beginning of the flow diagram (step 205 on FIG. 2) by way of flow chart connector FC3. If it is determined, however, at step 345, that the customer rejected the prices, then the transaction is terminated, and again, processing returns to the beginning of the flow diagram (step 205 in FIG. 2) by way of flow chart connector FC3.

If, on the other hand, it is determined at steps 330 and 345 that the customer has not provided either an acceptance or a rejection, then the system determines if an updated price has been received from the counterparty (step 350). If an updated price has been received, then control returns to step 315, where those updated prices are presented to the customer. If no updated price is received, the system determines, at step 355, whether a specified time limit has expired. If the specified time limit has expired, processing again continues at step 205 on FIG. 2 by way of flow chart connector FC3. If the time limit has not expired, then control returns again to step 330, where the system attempts to determine whether the customer has accepted or rejected the prices (steps 330 and 345, respectively).

Figure 4:
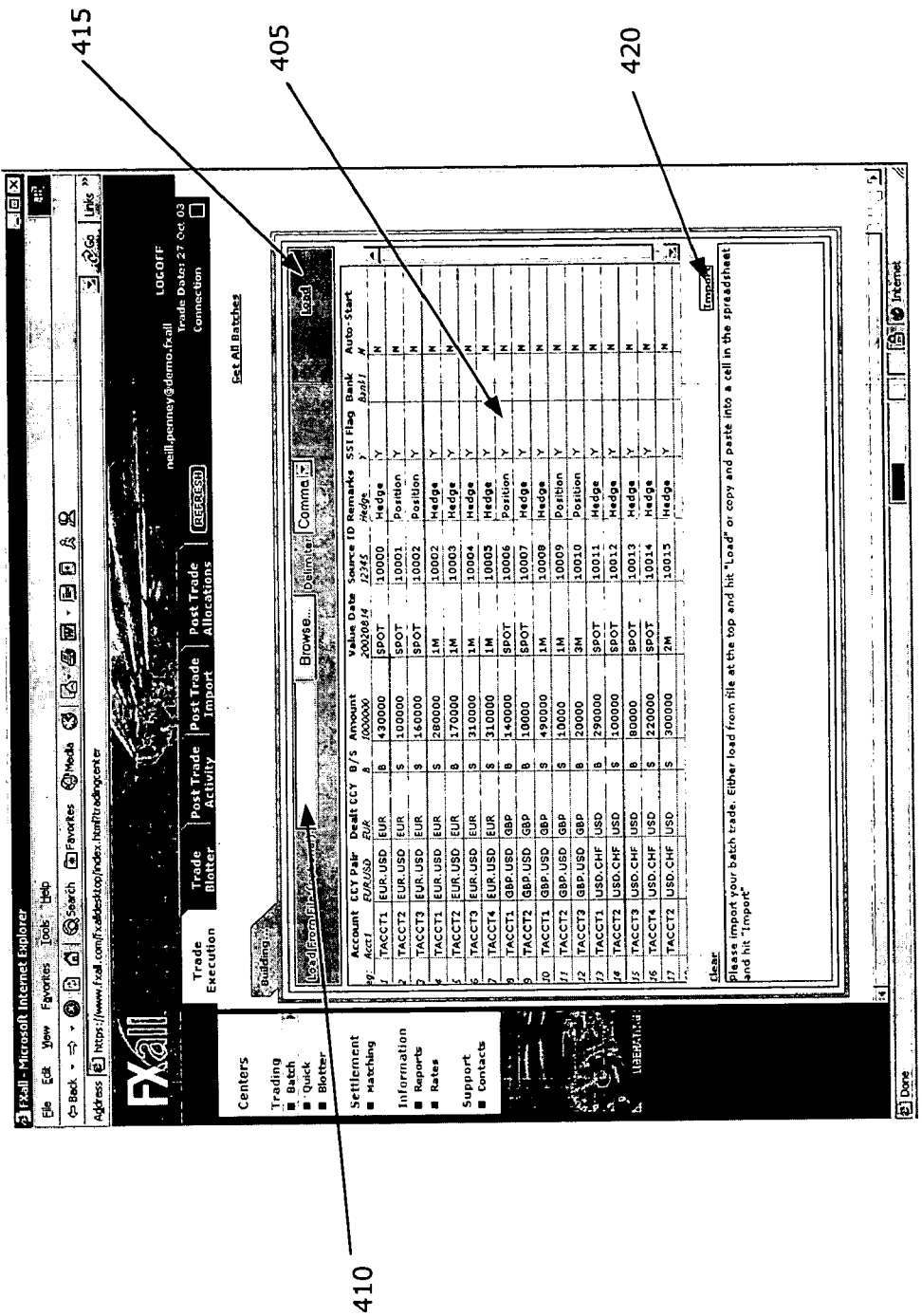
FIG. 4 illustrates an example of a user input screen that may be used to copy, paste and import trading requirements into an asset trading system configured to operate in accordance with principles of the present invention.

FIG. 4 illustrates an example of a user input screen that may be used to copy, paste and import requirements into a batch trading system configured to operate in accordance with principles of the present invention. This screen may be drawn, transmitted or presented, for instance, by user interface server 110 and customer order management system 140 in FIG. 1. As can be seen in the area generally designated by reference number 405, the example screen contains, among other things, the account numbers, currency pairs, dealt currencies, type of transaction ("B" for buy, "S" for sell) and value date for a set of trading requirements. In the example shown in FIG. 4, seventeen requirements are visible (see the area generally labeled with reference number 405). The requirements may be manually typed in by the customer, or, alternatively, loaded or pasted from another file or program. Accordingly, the screen also contains a text input field and control (labeled 410 and 415, respectively), which the customer may use to specify and load a file containing additional and/or alternative requirements. After loading or manually typing the requirements, the customer may transmit the requirements to a batch management server component of the invention, such as, for example, by clicking the "Import" button labeled 420 in FIG. 4.

Figure 5:
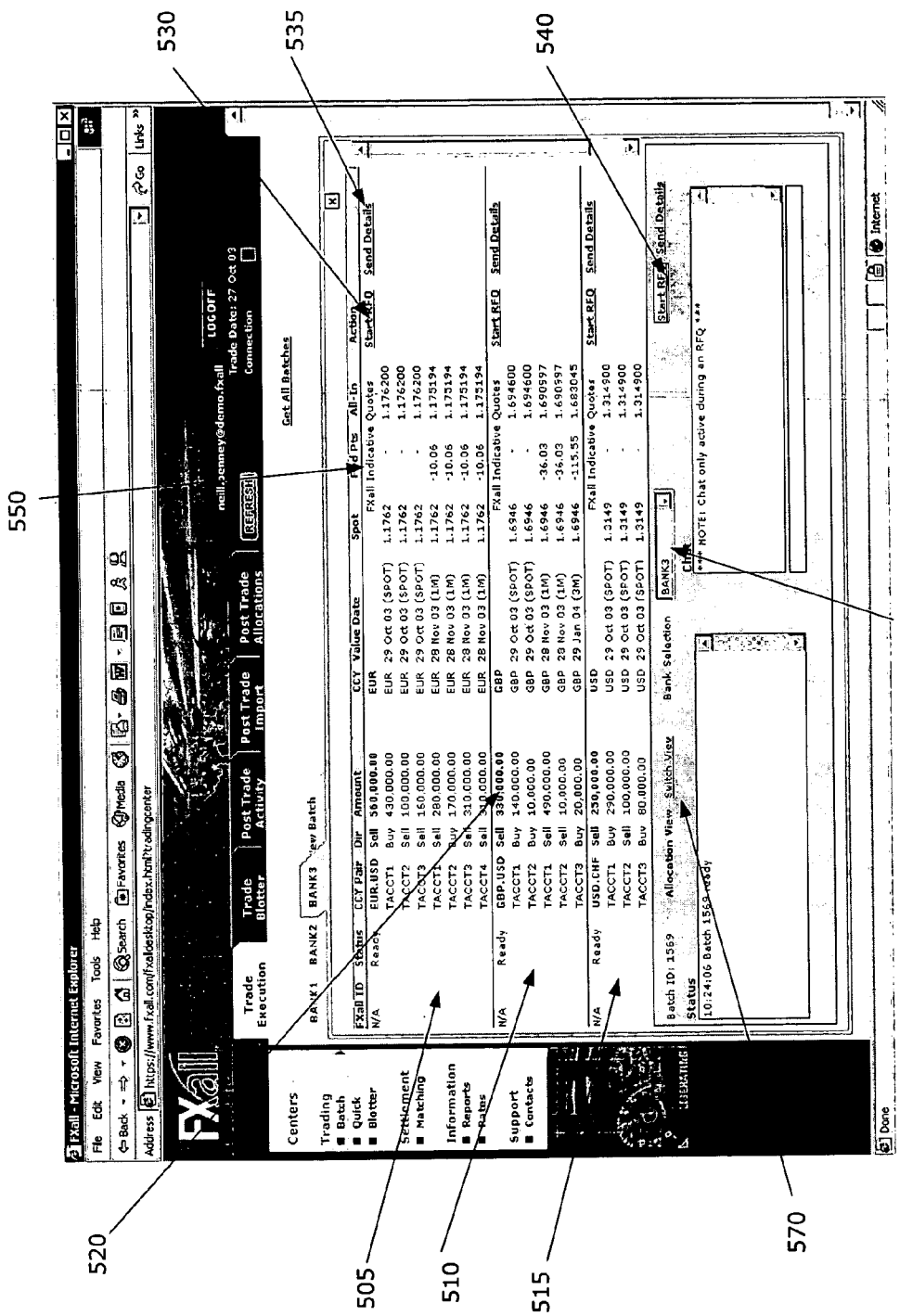
FIGS. 5 and 9 show examples of display screens that may be used, in accordance with features of the present invention, to present a batch of orders and requirements to the customer, along with indicative quotes, before they are submitted to a counterparty, such as a bank. In accordance with an embodiment of the present invention, the display screens of FIGS. 5 and 9 contain "allocation views" of the requirements, which show all of the requirements that make up the batch of orders.

FIG. 5 shows an example of a display screen that may be used to present the set of requirements after they have been arranged into a batch of orders and requirements, along with indicative quotes, before they are submitted to a counterparty, such as a bank. FIG. 5 shows fifteen requirements that have been arranged into three orders (generally labeled 505, 510 and 515). In this case, all of the requirements that have the same currency pair and dealt currency are arranged to be in the same order. For example, all requirements having a currency pair of EUR.USD have been placed in the order designated 505. In addition, the netted value of all of the requirements in a particular order has been computed and is displayed at the top of each order. For instance, the netted value of the five requirements in order 510 is 330,00 GBP. Thus, 330,000 GBP (labeled 520 in FIG. 5) is shown at the top of order 510. Indicative prices for each requirement are also shown in the columns generally designated 550.

An input field (labeled 525 in FIG. 5) is also provided so that the customer may specify a preferred bank to send the orders. Controls (labeled 530 and 535) are provided so that the customer may send one or more orders to the designated bank with or without setting the "send details" flag described above with reference to FIGS. 2 and 3. Finally, a control (labeled 540 in FIG. 5) is provided so that the customer may send the entire batch (all requirements in all orders on the screen) simultaneously.

Figure 6:
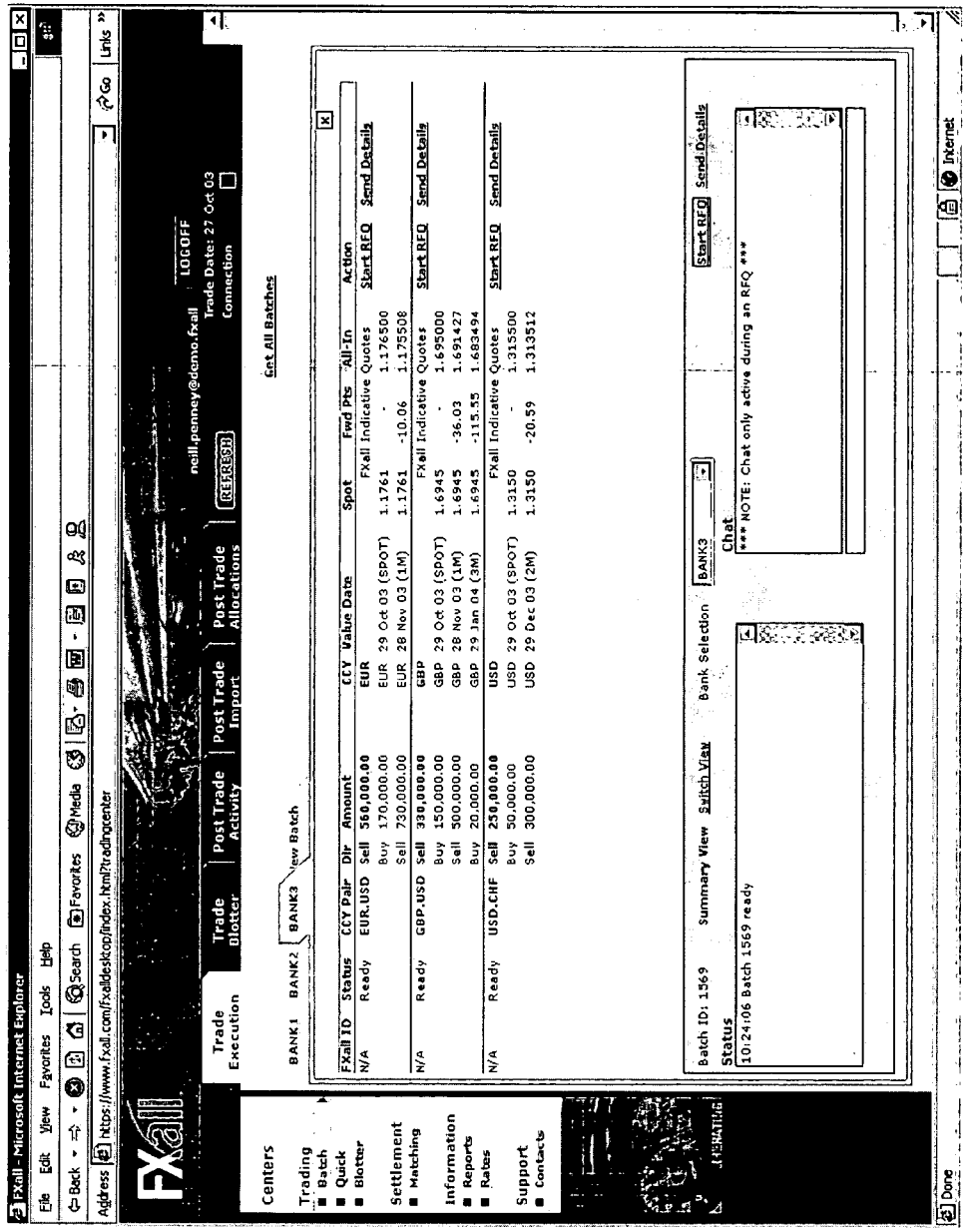
FIGS. 6 and 10 also show examples of display screens that may be used, in accordance with features of the present invention, to present a batch of orders and requirements to the customer, along with indicative quotes, before they are submitted to a counterparty, such as a bank. According to embodiments of the present invention, however, the display screens of FIGS. 6 and 10 contain "summary views" of the trading requirements, which view constitutes an alternative to the allocation view depicted in FIGS. 5 and 9.

The exemplary display screen of FIG. 5, shows all of the requirements in each order. This is called an "allocation view" of the batch of orders. By selecting (e.g., clicking) the control labeled 570 in FIG. 5, the customer may instruct the system to combine and net the "sell" requirements in each order, as well as combine and net all of the "buy" requirements in each order. The result is the exemplary screen shown in FIG. 6, which is called a "summary view" of the batch of orders.

Figure 7:
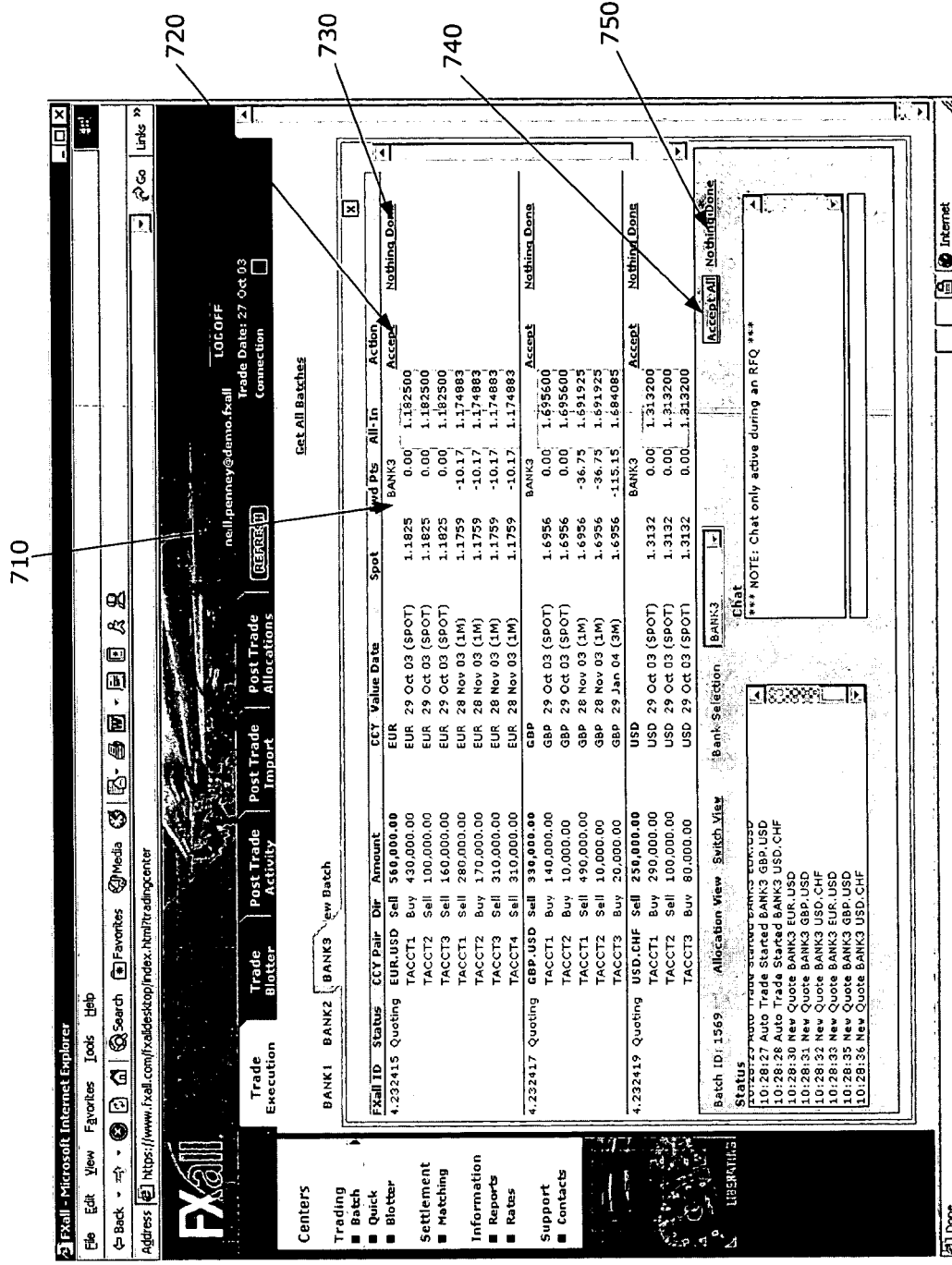
FIGS. 7 and 11 show allocation views of the requirements and price quotes for a batch of orders and quotes as they might be returned from a bank.
Figure 8:
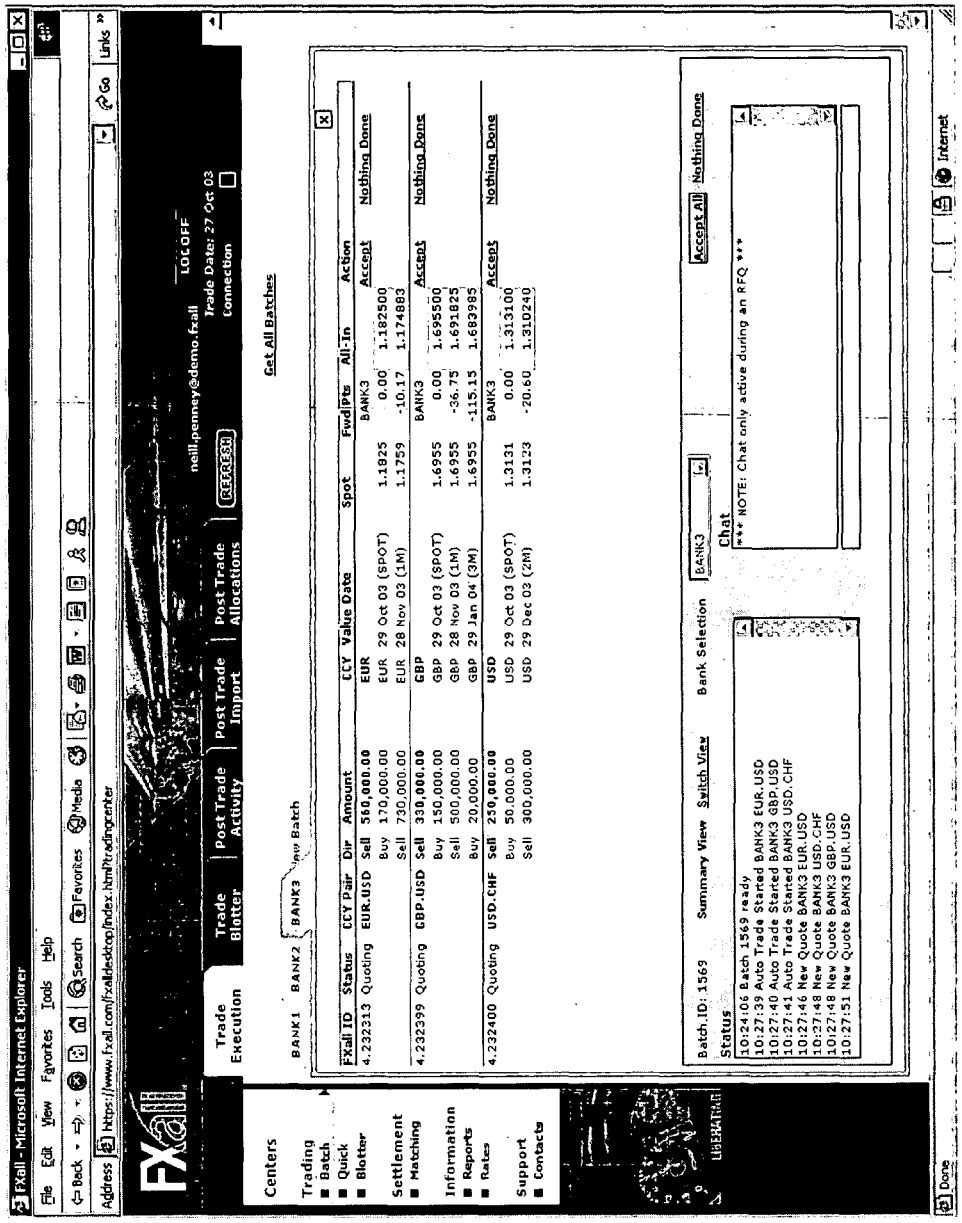
FIGS. 8 and 12 show summary views of the requirements and price quotes returned after the batch has been submitted to a bank.

FIG. 7 shows an allocation view of the requirements after the batch has been submitted to, priced and returned by a bank. As shown in FIG. 7, an actual price quote is alongside each requirement (see the column generally labeled 710 in FIG. 7). Controls 720 and 730 are provided so that the customer may accept or reject one or more orders. Further, controls 740 and 750 are configured to provide a way for the customer to accept or reject, in one click, the entire batch of orders. FIG. 8 shows a summary view of the batch of orders contained in FIG. 7.

Figure 9:
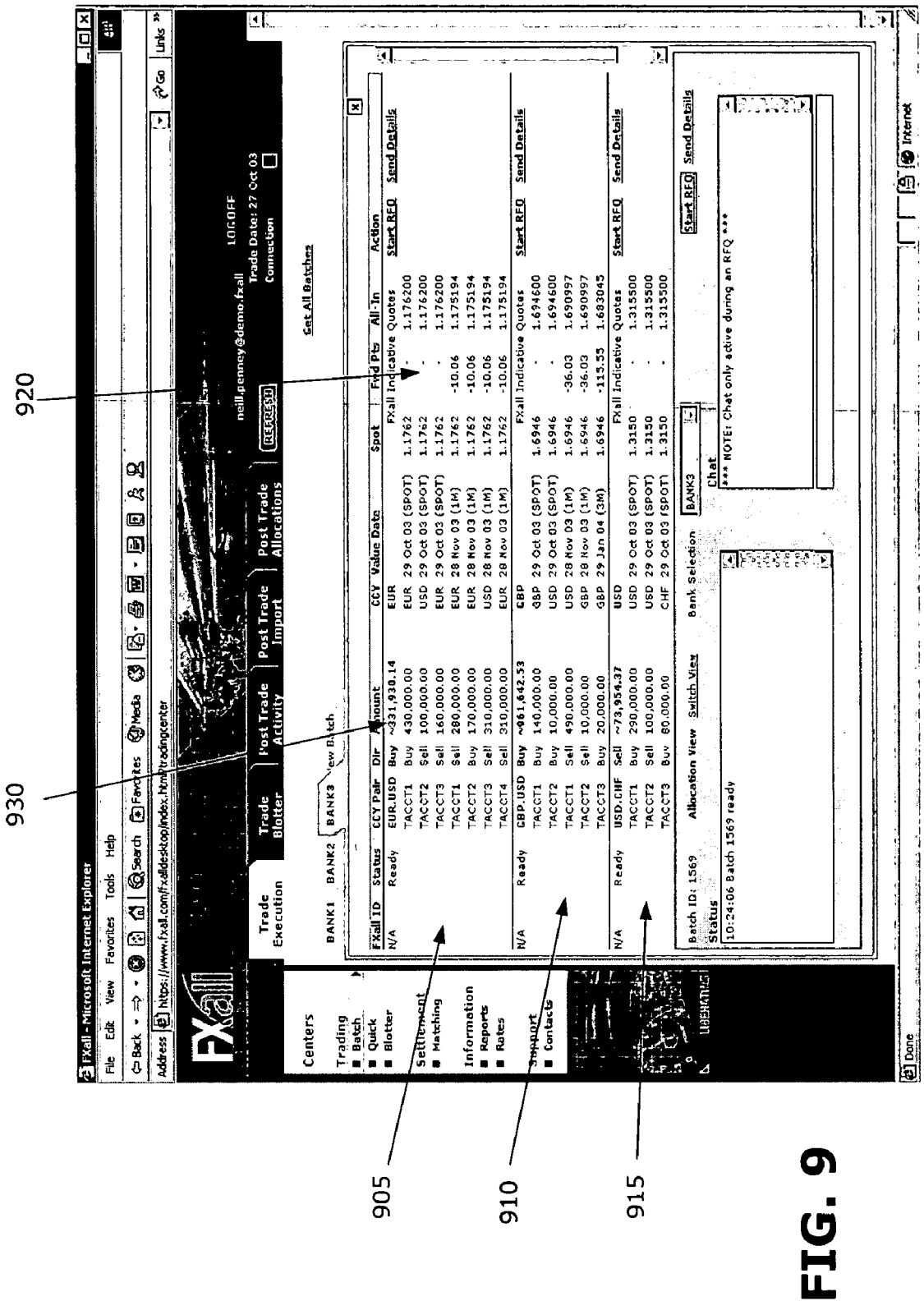

In FIGS. 4 through 8, the orders are "netted" across requirements that have the same currency pair and the same dealt currencies. In FIGS. 9 through 12, however, the orders are "netted" across requirements that have the same currency pair and different dealt currencies. Thus, for example, FIG. 9 shows an allocations view of a batch of orders (labeled 905, 910 and 915 in FIG. 9) comprising the set of requirements, along with indicative quotes (see the columns generally designated 920 in FIG. 9) for each requirement. As shown in FIG. 9, however, each order contains requirements that have different dealt currencies. Order 905, for example, contains some requirements that specify EUR as the dealt currency and other requirements that specify USD as the dealt currency.

Figure 10:
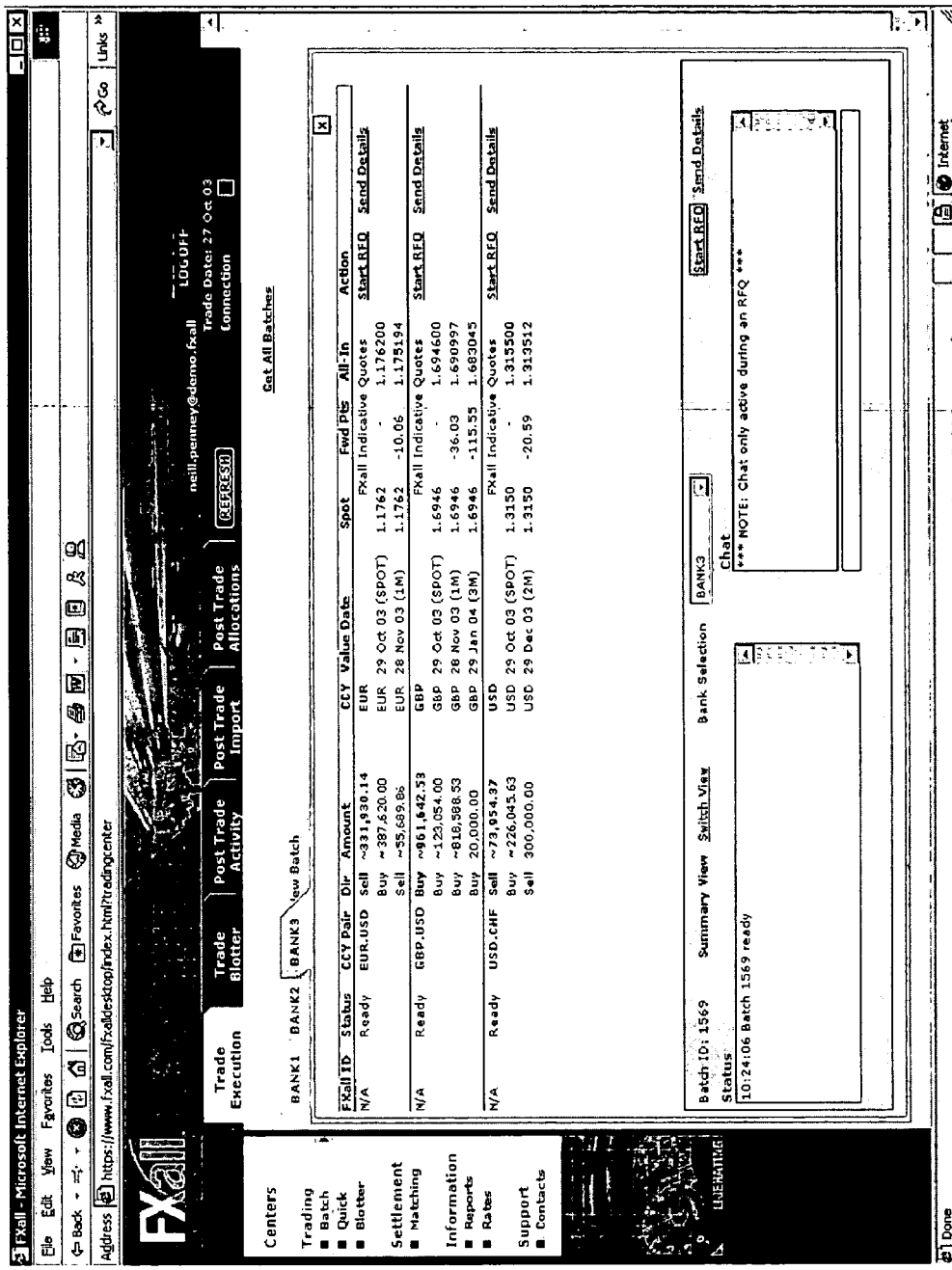

The netted value of requirements having different dealt currencies, shown at the top of each order (see 930 in FIG. 9) is calculated according to the indicative price for the exchange rate between the two dealt currencies. The netted value is shown with an approximation indicator ("~") to remind the customer that the netted value shown is only an approximation based on an "indicative" price, and not an actual quote. FIG. 10 shows an example of a summary view of the batch of orders contained in FIG. 9.

Figure 11:
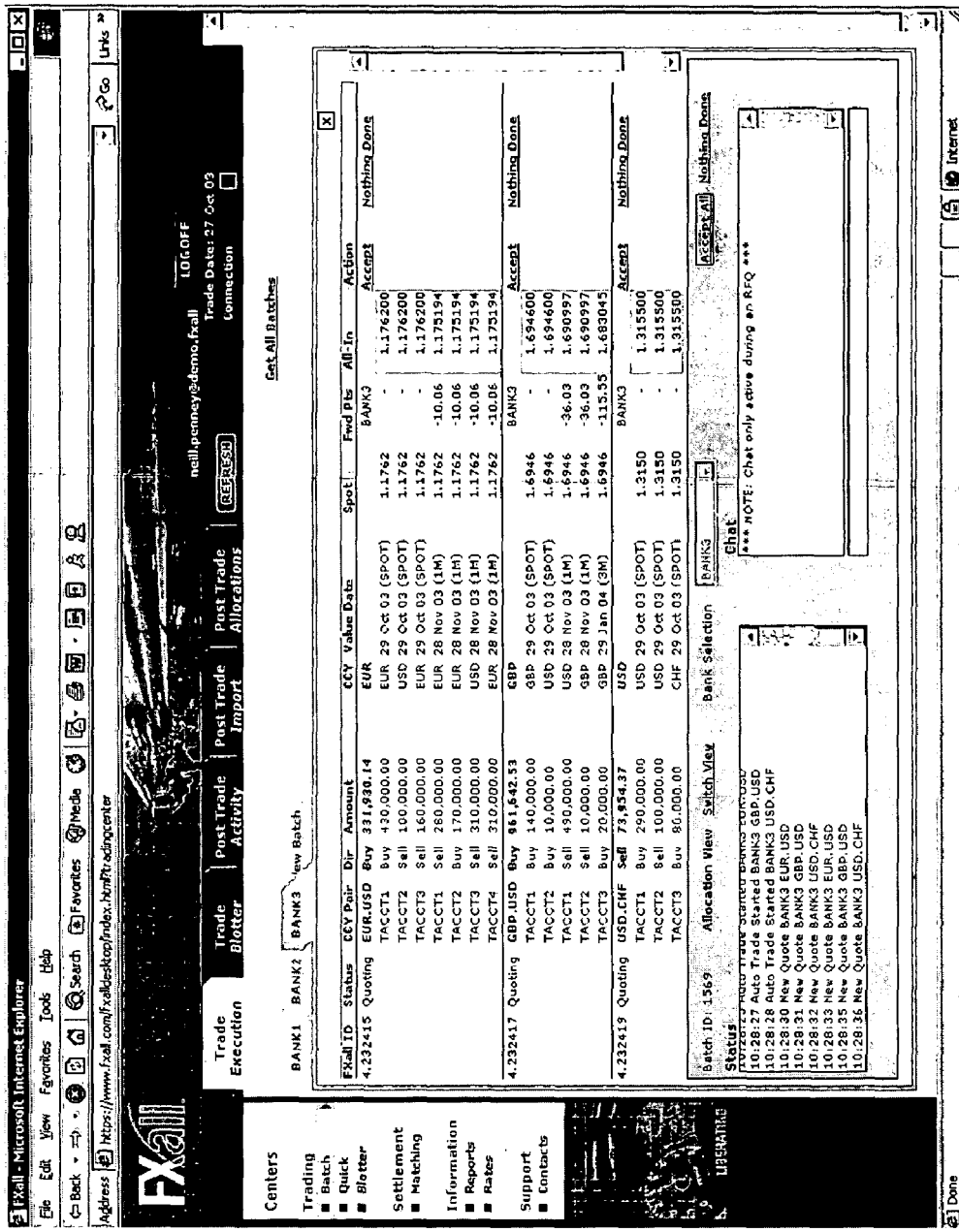
Figure 12:
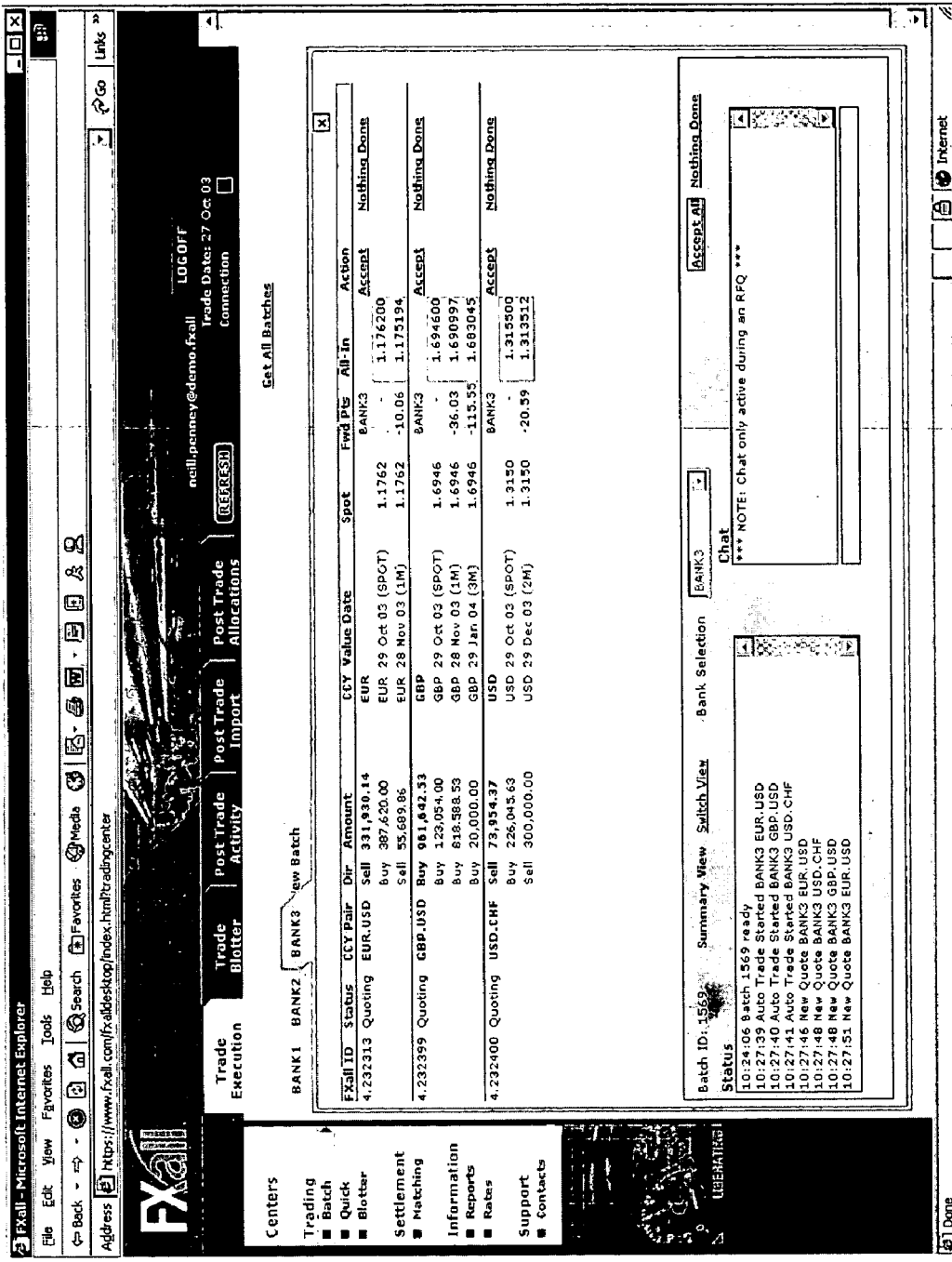

FIG. 11, like FIG. 7, shows an allocation view of the requirements in a batch of orders after the batch has been submitted to, priced and returned by a bank. However, FIG. 11 shows an allocations view for a batch of orders, where there are requirements in the orders that have different dealt currencies. Since the bank has provided actual quotes and the indicative quotes are no longer being used to calculate the netted values, the approximation symbol ("~") is not used. FIG. 12 shows an example of a summary view of the batch of orders contained in FIG. 11.

The present invention has been disclosed and described herein in what is considered to be its most preferred embodiments. It should be noted that variations and equivalents may occur to those skilled in the art upon reading the present disclosure and that such variations and equivalents are intended to come within the scope of the invention and the appended claims. Therefore, for example, it should be understood by one skilled in the art that the present invention is not limited to foreign exchange transactions, and may be beneficially applied to other types of transactions as described above.

What is claimed is:

1. An asset trading system, comprising:
 a communications channel for receiving a set of order requirements from a customer;
 a batch management server configured to arrange the set of order requirements into a batch of orders, each order in the batch comprising a group of two or more trades configured to satisfy, respectively, two or more order requirements from the set of order requirements;
 a trading server configured to receive, for each order in the batch, a price for executing the group of trades in said each order; and
 a user interface configured to present the prices for each order in the batch to the customer via the communications channel and to receive an acceptance for at least one order in the batch;
 wherein, responsive to the acceptance, the trading server is configured to execute the group of trades in said at least one order.

2. The system of claim 1, wherein the user interface is further configured to receive from the customer, via the communications channel, a request to provide the price.

3. The system of claim 1, further comprising a post-execution-stage processor configured to confirm the group of trades has been executed.

4. The system of claim 1, further comprising a post-execution-stage processor configured to settle the group of trades.

5. The system of claim 1, wherein the user interface is further configured to send a notice to the customer, via the communications channel, indicating that the group of trades has been executed.

6. The system of claim 1, wherein the batch management server is configured to arrange the set of order requirements according to a set of preferences.

7. The system of claim 6, wherein the user interface is further configured to receive an instruction from the customer, via the communications channel, to modify the set of preferences.

8. The system of claim 6, wherein the set of preferences comprises at least one of the following:
a maximum value for an order; and
a minimum value for an order.

9. The system of claim 6, further comprising an administrative server configured to store the set of preferences.

10. The system of claim 1, wherein:
the batch management server is configured to determine whether the set of order requirements comprises at least two order requirements having a particular currency pair and
the batch manager is further configured to assign the at least two order requirements to the same order.

11. The system of claim 10, wherein the batch management server is further configured to compute a netted value for the at least two order requirements.

12. The system of claim 10, wherein the batch management server is configured to determine whether the set of order requirements comprises at least two order requirements that do not have the same dealt currency.

13. The system of claim 12, wherein the batch management server is further configured to compute a netted value for the at least two order requirements.

14. The system of claim 1, wherein:
the batch management server is configured to determine whether the set of order requirements comprises at least two order requirements associated with a particular account and
to assign the at least two order requirements to the same order.

15. The system of claim 14, wherein the batch management server is further configured to compute a netted value for the at least two order requirements.

16. The system of claim 1, wherein:
the batch management server is configured to determine whether the set of order requirements comprises at least two order requirements having a particular value date and
the batch manager is further configured to assign the at least two order requirements to the same order.

17. The system of claim 16, wherein the batch management server is further configured to compute a netted value for the at least two order requirements.

18. The system of claim 1, wherein:
the batch management server is configured to determine whether the set of order requirements comprises a first order requirement comprising a proposal to buy or sell a security and
a second order requirement comprising a proposal to exchange one currency for another currency and
the batch manager is further configured to assign the first order requirement and the second order requirement to the same order.

19. The system of claim 18, wherein the batch management server is further configured to compute a netted value for the first order requirement and the second order requirement.

20. The system of claim 1, further comprising an indicative price engine configured to generate indicative prices for executing the group of trades.

21. The system of claim 20, wherein the indicative price engine is communicatively coupled to the batch management server.

22. The system of claim 1, wherein the batch management server is further configured to form a collection of quotes by generating at least one quote for every order in the batch.

23. The system of claim 22, wherein the user interface is further configured:
to present the collection of quotes to the customer via the communications channel; and
to receive from the customer, via the communications channel, an instruction to accept the collection of quotes.

24. The system of claim 1, wherein the user interface is further configured to receive from the customer a request to send the order to a counterparty.

25. The system of claim 24, wherein the counterparty comprises a bank.

26. The system of claim 24, wherein the counterparty comprises a broker.

27. The system of claim 24, wherein the request includes an indication that the order comprises a detail associated with a prior transaction between the customer and the counterparty.

28. The system of claim 27, wherein the trading server is further configured to receive from the counterparty an additional term for the prior transaction.

29. The system of claim 28, wherein the additional term comprises a trading price.

30. The system of claim 28, wherein the additional term comprises a price adjustment.

31. The system of claim 1, wherein the user interface is further configured to display the batch to the customer via the communications channel.

32. The system of claim 1, further comprising a second communications channel, coupled to the trading server, configured to convey the order from the trading server to a counterparty.

33. The system of claim 32, wherein the second communications channel is further configured to convey the price from the counterparty to the trading server.

34. The system of claim 32, wherein the second communications channel is further configured to convey the acceptance from the trading server to the counterparty.

35. The system of claim 32, wherein the second communications channel is further configured to convey a confirmation responsive to the acceptance from the counterparty to the trading server.

36. The system of claim 34, wherein the trading server is further configured to send a notice to the counterparty, via the second communications channel, indicating that the group of trades has been executed.

37. The system of claim 1, wherein the user interface is further configured to receive from the customer an instruction identifying a preferred counterparty for the order.

38. The system of claim 37, wherein the trading server is further configured to transmit the order to the preferred counterparty.

39. The system of claim 22, wherein the user interface is further configured to receive from the customer an instruction identifying a preferred counterparty for each order in the collection.

40. The system of claim 39, wherein the trading server is further configured to transmit each order in the collection to the preferred counterparty for said each order.

41. The system of claim 1, wherein the communications channel comprises an Internet connection.

42. The system of claim 32, wherein the second communications channel comprises an Internet connection.

43. The system of claim 1, wherein the communications channel comprises a wide area network connection.

44. The system of claim 32, wherein the second communications channel comprises a wide area network connection.

45. The system of claim 1, wherein the communications channel comprises a local area network connection.

46. The system of claim 32, wherein the second communications channel comprises a local area network connection.

47. The system of claim 1, wherein the communications channel comprises a telephone connection.

48. The system of claim 32, wherein the second communications channel comprises a telephone connection.

49. The system of claim 1, wherein the subset of order requirements includes a proposal to exchange one currency for another currency.

50. The system of claim 1, wherein the subset of order requirements includes a proposal to lend or borrow a sum of money.

51. The system of claim 1, wherein the subset of order requirements includes a proposal to buy or sell a commodity.

52. The system of claim 1, wherein the subset of order requirements includes a proposal to buy or sell a security.

53. The system of claim 1, further comprising a transaction database configured to store transaction details associated with the group of trades.

54. The system of claim 7, further comprising an administrative server configured to store the set of preferences for the customer.

55. The system of claim 54, wherein the administrative server is further configured to store a set of trading rules associated with the customer.

56. The system of claim 1, further comprising an order management system configured to receive input directly from the customer.

57. The system of claim 56, wherein the customer trade management system comprises a straight-through processing adapter.

58. The system of claim 1, further comprising a counterparty trade management system configured to receive input directly from the counterparty under the control of the trading server.

59. The system of claim 58, wherein the counterparty trade management system comprises a rate engine configured to generate the actual price for each order requirement in the set of order requirements.

60. The system of claim 1, further comprising a security server configured to prevent unauthorized access to the user interface.

61. The system of claim 60, wherein the security server is coupled to a security database comprising security-related data associated with the customer.

62. The system of claim 1, further comprising a security server configured to prevent unauthorized access to the trading server.

63. The system of claim 62, wherein the security server is coupled to a security database comprising security-related data associated with a counterparty.

* * * * *

UNITED STATES PATENT AND TRADEMARK OFFICE
CERTIFICATE OF CORRECTION

PATENT NO. : 8,160,950 B2  Page 1 of 1
APPLICATION NO. : 10/703090
DATED : April 17, 2012
INVENTOR(S) : Penney et al.

It is certified that error appears in the above-identified patent and that said Letters Patent is hereby corrected as shown below:

Column 2, line 38, insert --on-- between "one" and "an".

Column 5, line 6, insert --a-- between "form' and "new".

Column 7, line 48, insert --to-- between "according" and "the".

Signed and Sealed this
Fourteenth Day of August, 2012

David J. Kappos
*Director of the United States Patent and Trademark Office*